UNITED STATES PATENT OFFICE.

PETER V. ROUDIEZ, OF CHICOPEE, MASSACHUSETTS.

IMPROVEMENT IN WATER-PROOFING COMPOUNDS FOR FABRICS.

Specification forming part of Letters Patent No. 131,563, dated September 24, 1872.

*To all whom it may concern:*

Be it known that I, PETER V. ROUDIEZ, of Chicopee, in the county of Hampden and State of Massachusetts, have invented a new and useful Improved Water-Proofing Preparation; and I do hereby declare that the following is a full, clear, and exact description thereof.

My preparation is composed in general of a mixture of water, alum, acetate of lead, carbonate of magnesia, and white gum arabic; and I find the following process to produce the best results for the admixture of the different ingredients, and in about the following proportions: Say, for thirty-one quarts of water, I put about one and one quarter pound of alum in a vessel by itself and dissolve it in a sufficient quantity of hot water for that purpose. I also put about ten ounces of acetate of lead into a vessel by itself and dissolve that in a suitable quantity of hot water. I also dissolve about one and a half ounce of carbonate of magnesia in a sufficient quantity of cold water for that purpose in a suitable vessel by itself. Then, after all the above ingredients are thoroughly dissolved separately, I put, first, the acetate of lead into the solution of alum, then the carbonate of magnesia; and for about every ten quarts of this liquid I add about one table-spoonful of white gum arabic; and I stir the whole together thoroughly for about one half hour, and let it rest for twenty-four hours. I then skim off all the impurities which will have risen to the top, and I leave the liquid standing for about twenty-four hours longer, stirring and skimming as occasion requires; and after about forty-eight hours from its first mixture it will be ready for use. The mixture may be made in any large tub or other convenient vessel.

I use the mixture thus made as follows, in applying the same to any woven or knitted fabric for the purpose of rendering it impervious to water: Take a suitable vessel or tub, and, having placed the fabric therein, pour in some of the mixture and beat the fabric well, with the liquor in contact, so that the liquor may enter thoroughly into the fabric, gradually adding more liquor, and beating the fabric until the fabric is well covered and filled by the liquor in the vessel. I then let the whole stand for about one hour, and then remove the fabric, dry and brush, it to remove any light spots there may be, especially upon dark-colored cloth, and it is then ready for use.

This preparation may be applied to any fabric, whether woven or knitted, however nicely and perfectly finished, without in the least staining or soiling it, and when applied to any fabric it will be rendered perfectly impervious to water by any ordinary application of water thereto.

Having thus described my invention, what I claim as new, and desire to secure by Letters Patent, is—

The preparation hereinbefore described, substantially as and for the purposes herein set forth.

PETER V. ROUDIEZ, M. D.

Witnesses:
   T. A. CURTIS,
   CLARENCE E. BUCKLAND.